United States Patent [19]
Pappalardo et al.

[11] Patent Number: 6,002,601
[45] Date of Patent: Dec. 14, 1999

[54] SHARING OF EXTERNAL COMPONENTS FOR THE CONTROL OF THE SWITCHING DEAD-TIME OF A PLURALITY OF INTEGRATED DEVICES COOPERATING IN DRIVING AN R-L MULTI-PHASE ACTUATOR

[75] Inventors: Salvatore Pappalardo, Catania; Aldo Novelli, San Lorenzo di Parabiago; Angelo Genova, Delia; Alberto De Marco, Milan, all of Italy

[73] Assignee: STMicroelectronics S.R.L., Agrate Brianza, Italy

[21] Appl. No.: 09/114,556

[22] Filed: Jul. 13, 1998

[30] Foreign Application Priority Data

Jul. 28, 1997 [EP] European Pat. Off. .............. 97830398

[51] Int. Cl.⁶ ...................................................... H02M 7/00
[52] U.S. Cl. .............................................. 363/71; 363/147
[58] Field of Search ................................. 363/147, 17, 71, 363/56

[56] References Cited

U.S. PATENT DOCUMENTS

| | | | |
|---|---|---|---|
| 4,670,833 | 6/1987 | Sachs | 363/132 |
| 5,043,859 | 8/1991 | Koman et al. | 363/147 |
| 5,170,337 | 12/1992 | Borowiec et al. | 363/147 |

FOREIGN PATENT DOCUMENTS

| | | |
|---|---|---|
| 0 160 896 | 11/1985 | European Pat. Off. . |
| 0 311 957 | 4/1989 | European Pat. Off. . |

OTHER PUBLICATIONS

"Commande d'un moteur pas a pas par circuit intégré", *Electronique Applications*, No. 44, Oct. 1985, pp. 29–35.

*Primary Examiner*—Shawn Riley
*Attorney, Agent, or Firm*—Allen, Dyer, Doppelt, Milbrath & Gilchrist, P.A.

[57] ABSTRACT

In multi-phase driving systems of electric motors in a switching mode employing distinct integrated half-bridge output stages, the use of multiple external components for each integrated half-bridge stage to implement functions of adjustment of the switching dead-time and of disabling/enabling of the half-bridge stage can be avoided and an improved matching obtained by using single external components connected in common to the dedicated pins of all the distinct integrated half-bridge output stages. This is achieved by duplicating the disabling comparator, respectively for the power transistor of the pull-up branch and for the power transistor of the pull-down branch in each integrated half-bridge stage.

21 Claims, 4 Drawing Sheets

SHARING OF EXTERNAL COMPONENTS FOR THE CONTROL OF THE SWITCHING DEAD-TIME OF A PLURALITY OF INTEGRATED DEVICES COOPERATING IN DRIVING AN R-L MULTI-PHASE ACTUATOR

FIELD OF THE INVENTION

The present invention relates in general to integrated circuits for driving external components through half-bridge power stages, and, more particularly, to driving systems for multi-phase motors.

BACKGROUND OF THE INVENTION

Integrated circuits for driving systems through half-bridge power stages are widely used in industrial applications, such as for driving three-phase motors, stepper motors, brushless motors or a generic resistance-inductance (R-L) actuator. When these integrated devices possess only one logic command input, it becomes necessary to implement a circuit that regulates the switching dead-time to avoid a simultaneous state of conduction of the two branches, that is, of the two power devices (HIGH SIDE and LOW SIDE) of the half-bridge stage. In the majority of cases, it is necessary to program or adjust the value of the switching dead-time by taking into account the electrical characteristics of the driven R-L actuator.

FIG. 1 shows a classical way of realizing such a dead-time programming function, using a dedicated PIN of the integrated device IC1. This dedicated pin serves to implement both the programming function of the switching dead-time by suitably dimensioning the external resistor $R_{ex}$, and the disabling/enabling logic function of the half-bridge power stage of the integrated device through a dedicated external switch S1, controlled by a specific logic command SHUT-DOWN.

By referring to the conventional scheme of FIG. 1, the amplifier (buffer) A1 restores a certain reference voltage Vbg (typically a band-gap voltage) on the dedicated PIN. Through the external resistor $R_{ex}$ it is then possible to regulate the switching dead-time (Tdt) generated by the DEAD-TIME block, by considering that:

$$Tdt = C * \frac{V}{I_R} \quad I_R = \frac{V_{bg}}{R_{ex}} \quad Tdt = C * R_{ex} \tag{1}$$

where C is the delay capacitance within the DEAD-TIME circuit block, V is the voltage existing on such capacitance C at the switching instant, and $I_R$ is the current that charges the capacitance C.

The comparator COMP1 compares the voltage on the dedicated pin with ceratin reference voltage REF1, and produces a shutdown or enabling signal of the output power stage HALF-BRIDGE. In practice, the logic function of "shutdown" is implemented by forcing a low logic stage on the pin PIN as referred to the threshold REF1 established on the inverting input node of COMP1.

According to this typical circuit implementation of a programming function of the switching dead-time and an enabling/disabling function of the half-bridge power stage, the output impedance of the operational amplifier (buffer) A1 is necessarily low to allow a good degree of precision for the circuit, as well as immunity to noise. These characteristics of known circuits do not allow connecting in common all the respective dedicated pins (PIN) and the use of a unique set of external components to implement the programming function of the switching dead-time and of enabling/disabling of all the integrated power devices of the multi-phase driving system. This is so especially when they include several output stages, as in the case for driving multi-phase motors. In practice, according to the prior art, it is necessary to duplicate the external components and the respective lines for each integrated device (IC1, IC2, IC3), as depicted in FIG. 2.

SUMMARY OF THE INVENTION

These drawbacks and limitations of known systems are overcome by the circuit of the present invention which includes the use of a unique set of external components for any number of integrated half-bridge stages, cooperatively driving a multi-phase R-L actuator.

The circuit of the invention employs two distinct disabling comparators respectively for the power device of the pull-up branch, and for the power device of the pull-down branch of the integrated half-bridge stage. The two comparators have their non-inverting inputs coupled in common with the pin dedicated to implement a function of adjustment the switching dead-time and of enabling/disabling of the half-bridge power stage. A first current generator forces a current on the node of the dedicated pin to which is connected an external resistor. This will be eventually connected to the respective dedicated pins of all the integrated devices used in driving a multi-phase actuator.

The inverting input of each of the two comparators of each integrated device is coupled to a capacitor that is charged by a second current generator. The voltage at the terminals of which is forced to ground potential by a switch, driven in phase opposition to the similar switch of the other comparator of the pair, by the logic signal input to the integrated half-bridge stage. Also the disabling command, common to all integrated devices cooperating in driving a multi-phase actuator, is implemented by the use of a single switch, connected to the common node of the dedicated pins of the distinct integrated circuits.

Therefore, the circuit of the invention allows for a saving of external components and interconnections in all applications wherein it is envisaged the use of two or more integrated circuits (multi-phase systems). Moreover, the circuit of the invention ensures a better match among the switching dead-times of both switching fronts of the distinct integrated circuit than was obtained with a known circuit.

BRIEF DESCRIPTION OF THE DRAWINGS

The various aspects and advantages of the invention will become even clearer through the following description of some preferred embodiments and by referring to the attached drawings wherein.

DETAILED DESCRIPTION OF PREFERRED EMBODIMENTS

Figure 1:
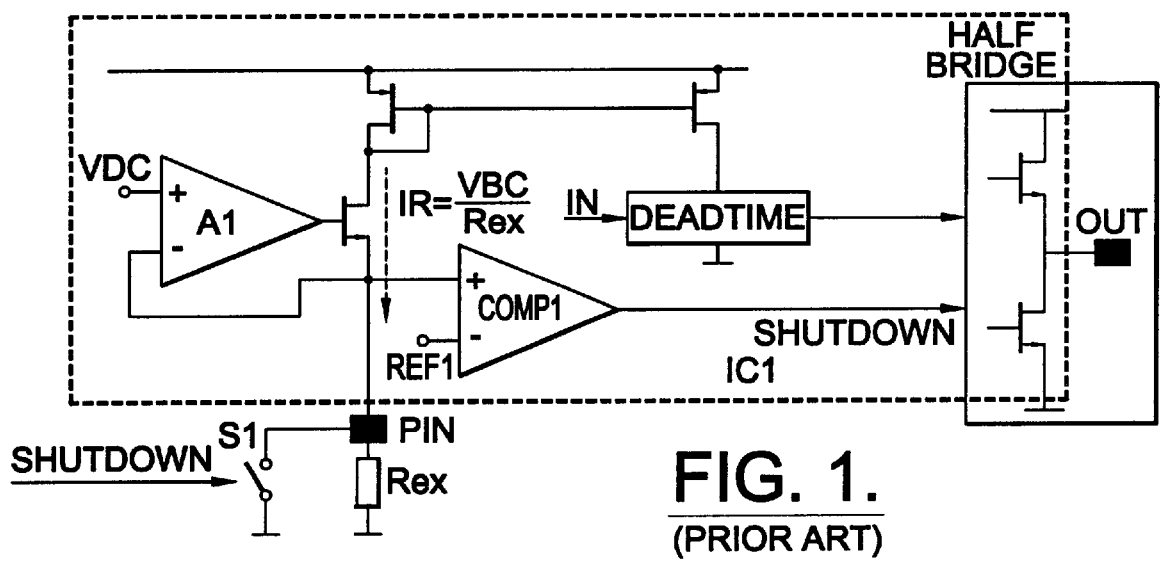
FIG. 1, as already mentioned, is a circuit diagram of a half-bridge integrated device according to the prior art.
Figure 2:
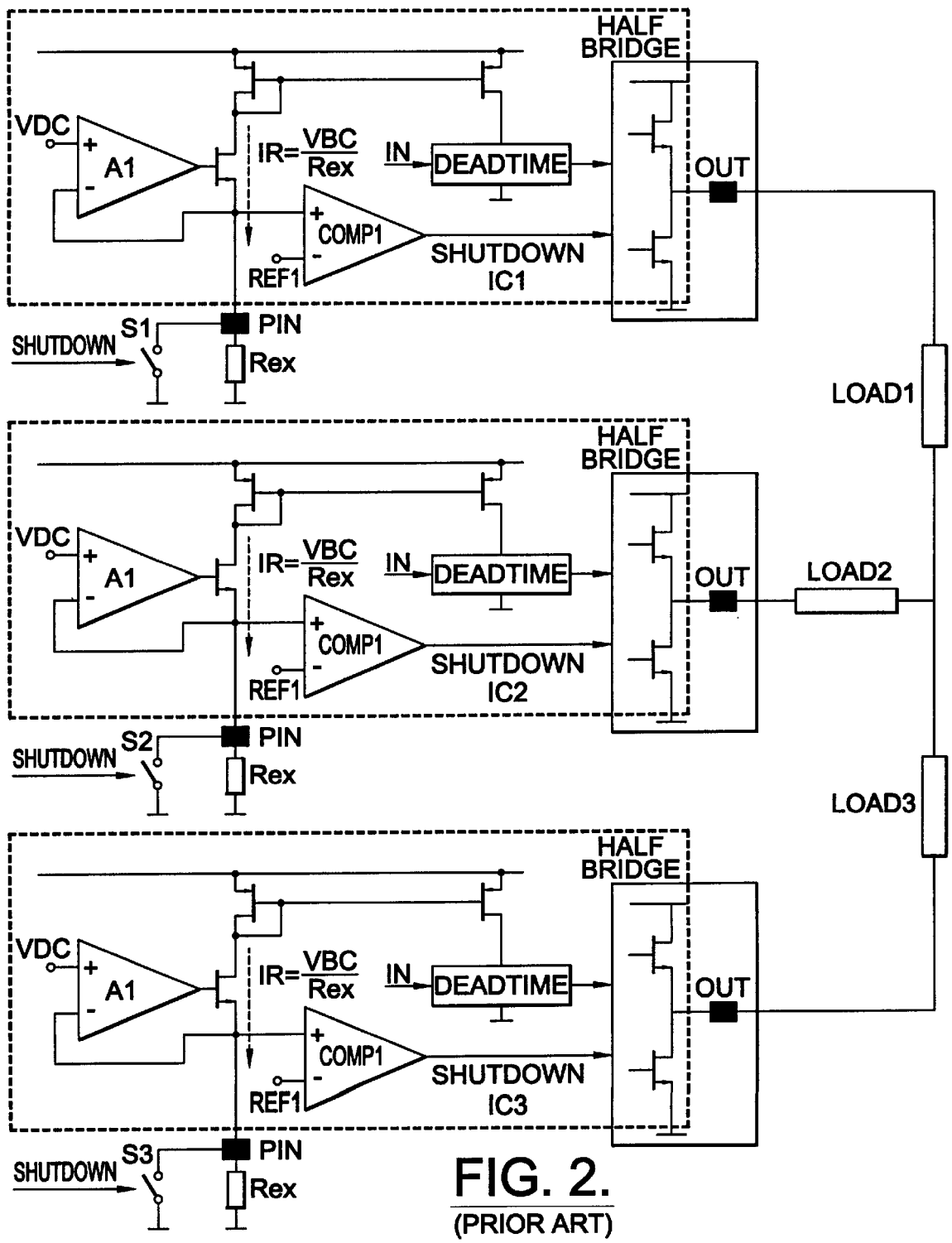
FIG. 2 shows a half-bridge driving scheme of the windings of a three-phase motor according to the prior art.
Figure 3A:
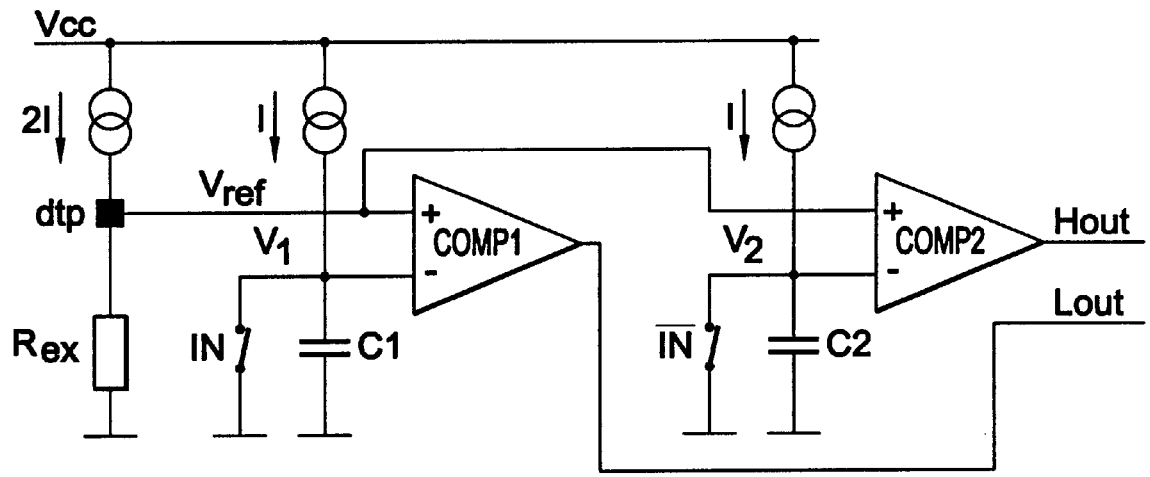
FIG. 3A shows a circuit for adjusting the switching dead-time and for enabling a half-bridge device according to the present invention.
Figure 3B:
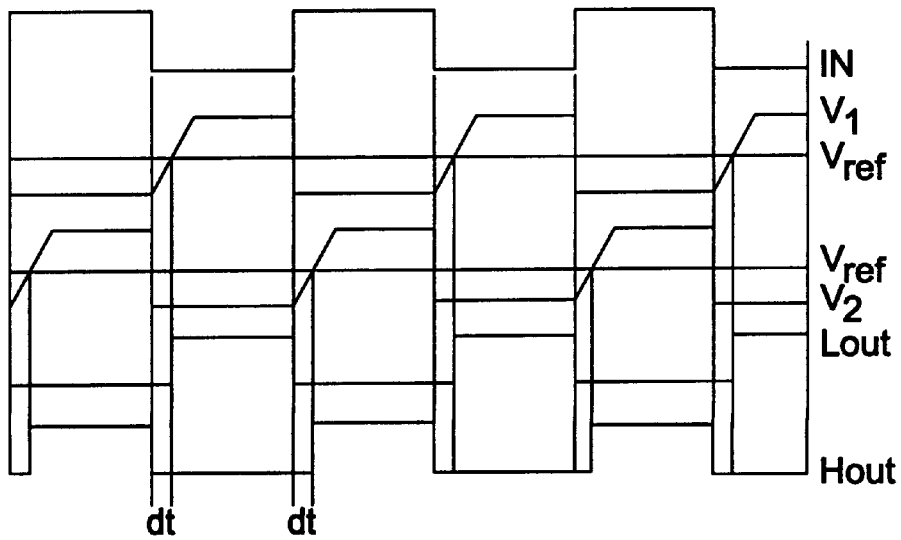
FIG. 3B shows relevant waveform diagrams from the circuit of FIG. 3A.

By referring to FIGS. 3A and 3B, the functioning of the circuit of the present invention may be illustrated as follows. The comparators COMP1 and COMP2 compare the reference voltage Iref applied to the non-inverting input thereof with respective voltages V1 and V2 of the respective inverting inputs. The voltage Vref depends on the value of the external resistor $R_{ex}$ connected to the dedicated pin of the device, while the voltages V1 and V2 correspond to the voltages existing on the terminals of identical capacitors C1 and C2, respectively connected to the inverting inputs of the two comparators comp1 and comp2. Identical current generators I charge the two capacitors C1 and C2, while a current generator A*I (where A is a constant) forces a certain constant current on the external resistor $R_{ex}$ (in the example of FIGS. 3A an d 3B, A is equal to 2).

The logic input signal IN of the device and its complement $\overline{IN}$ drive the switches connected in parallel with the relative capacitors C1 and C2. While one of the capacitors is kept discharged by the logic input signal, the other capacitor is charged with a constant current to reach the respective voltage V1 or V2. During this charging phase the voltage on the capacitance increases linearly.

By modifying the value of the external resistor $R_{ex}$ and as a consequence the value of the reference voltage Vref, it is possible to program the desired switching dead-time, because:

$$Tdt = C * \frac{Vref}{I} \quad \text{and} \quad V_{ref} = R_{ex} * A * I \qquad (2)$$

and $$V_{ref} = R_{ex} * A * I \qquad (2)$$

thereby:

$$Tdt = R_{ex} * A * I \qquad (3)$$

Figure 4:
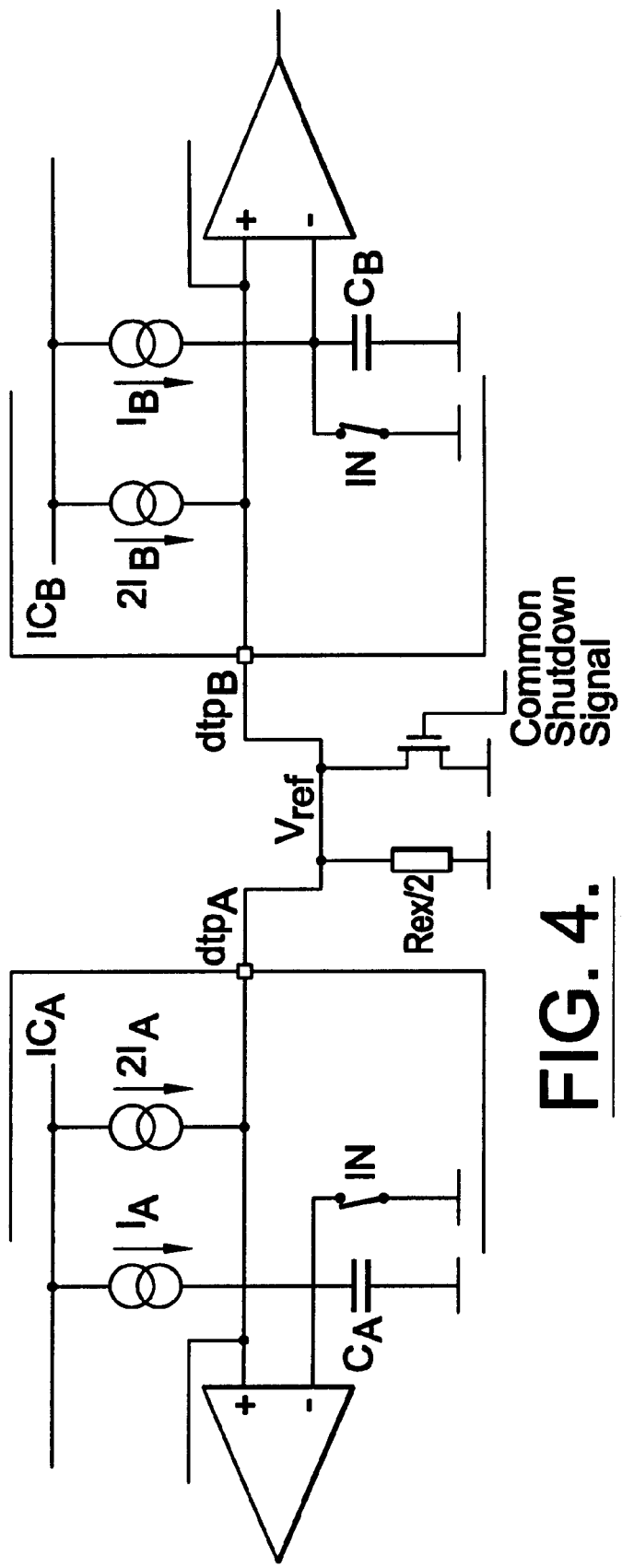
FIG. 4 shows a circuit and illustrates how two or more integrated half-bridge devices may share the same external components for regulating the switching dead-time and for enabling/disabling the half-bridge stages.

From the above equation it may be said that the circuit of the invention allows fixing a certain switching dead-time Tdt, which still depends on the value of the internal capacitance (C1=C2=C) and on the value of the external resistor $R_{ex}$. However, the circuit permits connecting in common the dedicated pins of a plurality of devices, while maintaining a good accuracy of regulation of the switching dead-time Tdt for all the integrated circuits. An example of such a possibility of parallel (common) connection of several integrated circuits is shown in FIG. 4.

If for a single integrated circuit (not connected in parallel) the switching dead-time is: $Tdt=C*A*R_{ex}$. When there are n integrated circuits connected in parallel, according to the invention, the switching dead-time for all of them will be given by: $Tdtp=C*A*n*R'_{ex}$, because $V_{ref}=n*R'_{ex}*A*I$.

To obtain the same switching dead-time for the single integrated circuit (Tdp=Tdtp), the value of the external resistance $R'_{ex}$ must be equal to:

$$R'_{ex} = R_{ex}/n$$

An example with n=2 is depicted in FIG. 4.

Therefore, the circuit of the invention fully satisfies the stated objective without undesirably increasing the circuit complexity. In addition, the circuit of the invention improves the performance of the single integrated device.

That which is claimed is:

1. A driving system for a plurality of half-bridge power stages connected to respective phase windings of a multi-phase R-L actuator, each half-bridge power stage comprising a pull-up transistor device and a pull-down transistor device, the driving system comprising:

an external resistor and an external switch connected in parallel with said external resistor; and a plurality of integrated devices, each integrated device being connected to a respective phase winding of the multi-phase R-L actuator, each integrated device comprising a dedicated pin and a circuit connected thereto, said plurality of integrated devices having said dedicated pins connected in common and to said external resistor for fixing a switching dead-time and connected to said external switch for enabling/disabling the half-bridge power stages;

said circuit for adjusting the switching dead-time for preventing simultaneous conduction of the pull-up transistor device and the pull-down transistor device and comprising a first current generator connected to said dedicated pins, two additional current generators and respective capacitors connected thereto, two switches connected in parallel with respective capacitors for forcing a voltage thereon to a first voltage, and two comparators for controlling shutdown of the pull-up transistor device and the pull-down transistor device, each comparator having a non-inverting input connected to said dedicated pins and onto which the first current generator forces a current through the external resistor, and an inverting input connected to a respective capacitor which is charged by a respective additional current generator and switch to force a voltage on the capacitor to the first voltage, the inverting inputs of said two comparators being driven by complementary input logic signals.

2. A driving system according to claim 1, wherein said plurality of integrated devices are three in number, each driving a respective one of three phase windings of a three-phase motor.

3. A driving system according to claim 1, wherein said two additional current generators are equal in performance.

4. A driving system according to claim 1, wherein said external resistor is a single external resistor.

5. A driving system according to claim 1, wherein said external switch is a single external switch.

6. A driving system according to claim 1, wherein the first voltage is ground.

7. A driving system for a multi-phase actuator of a type comprising a plurality of phase windings, said driving system comprising:

a plurality of half-bridge power stages connected to respective phase windings, each half-bridge power stage comprising a pull-up device and a pull-down device;

an external resistor and an external switch connected in parallel with said external resistor; and a plurality of integrated devices, each integrated device being connected to a respective phase winding of the multi-phase R-L actuator, each integrated device comprising a dedicated pin and a circuit connected thereto, said plurality of integrated devices having said dedicated pins connected in common and to said external resistor for fixing a switching dead-time and connected to said external switch for enabling/disabling the half-bridge power stages;

said circuit for adjusting the switching dead-time for preventing simultaneous conduction of the pull-up transistor device and the pull-down transistor device and comprising a first current generator connected to said dedicated pins, two additional current generators and respective capacitors connected thereto, two switches connected in parallel with respective capacitors for forcing a voltage thereon to a first value, and two comparators for controlling shutdown of the pull-up transistor device and the pull-down transistor device, each comparator having a non-inverting input connected to said dedicated pins and onto which the first current generator forces a current through the external resistor, and an inverting input connected to a respective capacitor which is charged by a respective additional current generator and switch for forcing a voltage on the capacitor to the first voltage, the inverting inputs of said two comparators being driven by complementary input logic signals.

8. A driving system according to claim 7, wherein said plurality of integrated devices are three in number, each driving a respective one of three phase windings of a three-phase motor.

9. A driving system according to claim 7, wherein said two additional current generators are equal in performance.

10. A driving system according to claim 7, wherein said external resistor is a single external resistor.

11. A driving system according to claim 7, wherein said external switch is a single external switch.

12. A driving system for a plurality of half-bridge power stages connected to respective phase windings of a multi-phase R-L actuator, each half-bridge power stage comprising a pull-up transistor device and a pull-down transistor device, the driving system comprising:

an external resistor and an external switch connected in parallel with said external resistor; and a plurality of distinct integrated devices, each integrated device being connected to a respective phase winding of the multi-phase R-L actuator, each integrated device comprising a dedicated pin and a circuit connected thereto, said circuit comprising at least two comparators for controlling shutdown of the pull-up transistor device and the pull-down transistor device, said plurality of integrated devices having said dedicated pins connected in common and to said external resistor for fixing a switching dead-time and connected to said external switch for enabling/disabling the half-bridge stages.

13. A driving system according to claim 14, wherein said circuit further comprises:

a first current generator connected to said dedicated pins;

two additional current generators and respective capacitors connected thereto; and two switches connected in parallel with respective capacitors for forcing a voltage thereon to a first voltage.

14. A driving system according to claim 12, wherein each comparator has a non-inverting input connected to said dedicated pins and onto which the first current generator forces a current through the external resistor, and an inverting input connected to a respective capacitor which is charged by a respective additional current generator and switch forcing a voltage on the capacitor to the first voltage; and wherein the inverting inputs of said two comparators are driven by complementary input logic signals.

15. A driving system according to claim 12, wherein said plurality of integrated devices are three in number, each driving a respective one of three phase windings of a three-phase motor.

16. A driving system according to claim 12, wherein said two additional current generators are equal in performance.

17. A driving system according to claim 12, wherein said external resistor is a single external resistor.

18. A driving system according to claim 12, wherein said external switch is a single external switch.

19. A method for driving a plurality of half-bridge power stages connected to respective phase windings of a multi-phase R-L actuator, each half-bridge power stage comprising a pull-up transistor device and a pull-down transistor device, the method comprising the steps of:

providing a plurality of integrated devices for respective phase windings of the multi-phase R-L actuator, each integrated device comprising a dedicated pin and a circuit connected thereto, said circuit comprising at least two comparators;

connecting the dedicated pins of said plurality of integrated devices in common and to an external resistor for fixing a switching dead-time and connecting in parrallel to the external resistor an external switch for enabling/disabling the half-bridge power stages; and using the two comparators for controlling shutdown of the pull-up transistor device and the pull-down transistor device.

20. A method according to claim 19, wherein said external resistor is a single external resistor.

21. A method according to claim 19, wherein said external switch is a single external switch.

* * * * *

UNITED STATES PATENT AND TRADEMARK OFFICE
CERTIFICATE OF CORRECTION

PATENT NO. : 6,002,601
DATED : December 14, 1999
INVENTOR(S) : Salvatore PAPPALARDO; Aldo NOVELLI; Angelo GENOVA; Alberto DEMARCO It is certified that error appears in the above-identified patent and that said Letters Patent is hereby corrected as shown below:

On the title page, item

[73] Assignee:
Strike: "STMicroelectronics S.R.L.,"
Insert: -- STMicroelectronics S.r.l., --

Column 3, line 18
Strike: "FIGS. 3A an d 3B."
Insert: -- FIGS. 3A and 3B. --

Column 3, line 35
Delete: "and"

Column 3, line 37
Delete: "$V_{ref} = R_{ex} * A * I$          (2) "

Column 6, line 4
Strike: "claim 14, "
Insert: -- claim 12, --

Column 6, line 43
Strike: "parrallel"
Insert: -- parallel --

Signed and Sealed this

Twenty-fifth Day of July, 2000

Attest:

Q. TODD DICKINSON

*Attesting Officer*          *Director of Patents and Trademarks*